(12) United States Patent
Kim et al.

(10) Patent No.: US 8,468,118 B2
(45) Date of Patent: Jun. 18, 2013

(54) SYSTEM AND METHOD FOR ANALYZING AND UTILIZING INTELLECTUAL PROPERTY INFORMATION

(75) Inventors: Jin-Kwan Kim, Suwon (KR); Jong-Soo Yoon, Cheonan (KR); Yea-Sun Yoon, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 2099 days.

(21) Appl. No.: 09/912,522

(22) Filed: Jul. 26, 2001

(65) Prior Publication Data
US 2002/0143760 A1 Oct. 3, 2002

(30) Foreign Application Priority Data
Jul. 26, 2000 (KR) .................................. 2000-43108

(51) Int. Cl.
*G06F 7/00* (2006.01)

(52) U.S. Cl.
USPC ............ 707/602; 707/758; 707/923; 707/930

(58) Field of Classification Search
USPC .............. 707/5, 6, 9, 2, 200, 3, 4, 102, 104.1, 707/10, 1, 100, 602, 722, 755, 758, 923, 707/930, 937, 999.001–999.004 999.101; 705/36, 1; 706/45; 168/27; 106/739
See application file for complete search history.

(56) References Cited

U.S. PATENT DOCUMENTS

| | | | | |
|---|---|---|---|---|
| 91,541 | A | * | 6/1869 | Johnson .......................... 168/27 |
| 5,598,536 | A | * | 1/1997 | Slaughter et al. ............. 709/219 |
| 5,673,428 | A | * | 9/1997 | Hirakawa .......................... 707/5 |
| 5,721,910 | A | * | 2/1998 | Unger et al. ................... 707/100 |
| 5,754,840 | A | * | 5/1998 | Rivette et al. ...................... 707/2 |
| 5,774,833 | A | * | 6/1998 | Newman ............................ 704/9 |
| 5,862,223 | A | * | 1/1999 | Walker et al. ................... 705/50 |

(Continued)

FOREIGN PATENT DOCUMENTS

| KR | 1020000021032 | 4/2000 |
|---|---|---|
| WO | WO 03/012689 A1 * | 2/2003 |

*Primary Examiner* — Robert Timblin
(74) *Attorney, Agent, or Firm* — F. Chau & Associates, LLC

(57) ABSTRACT

Disclosed are a system and a method for analyzing and utilizing intellectual property information. The method comprises the steps of registering search strategy formulas for extracting intellectual property (IP) information; accessing and searching Internet websites that provide IP information based on the registered search strategy formulas, and extracting first IP information according to the search; placing the first IP information in a standard form and performing a first storage operation of the first IP information, and transmitting the converted IP information to research center PCs; determining whether a request for detailed information has been made from the research center PCs, and if it has, accessing the Internet websites and extracting second IP information corresponding to the first IP information; and placing the second IP information in a standard form and performing a second storage operation of the converted IP information, and transmitting the converted IP information to the research center PCs. The system comprises an IP information extraction unit for extracting IP information according to the operation of software from at least one on-line IP information DB; an IP information analyzing unit for controlling the operation of the software, receiving the extracted IP information and storing the same together with data containing predetermined opinion contents, and outputting the IP information; and an E-mail receiving/transmitting unit for transmitting the IP information received from the IP information analyzing unit to research center PCs, and receiving feedback of data containing opinion contents from the research center PCs.

15 Claims, 2 Drawing Sheets

U.S. PATENT DOCUMENTS

| | | | | |
|---|---|---|---|---|
| 5,999,907 | A * | 12/1999 | Donner | 705/1 |
| 6,038,561 | A * | 3/2000 | Snyder et al. | 707/6 |
| 6,061,346 | A * | 5/2000 | Nordman | 370/352 |
| 6,088,765 | A * | 7/2000 | Ohtsuka | 711/113 |
| 6,154,725 | A * | 11/2000 | Donner | 705/1 |
| 6,216,159 | B1 * | 4/2001 | Chintakrindi et al. | 709/220 |
| 6,263,314 | B1 * | 7/2001 | Donner | 705/1 |
| 6,289,341 | B1 * | 9/2001 | Barney | 707/6 |
| 6,298,327 | B1 * | 10/2001 | Hunter et al. | 705/1 |
| 6,339,767 | B1 * | 1/2002 | Rivette et al. | 707/781 |
| 6,366,961 | B1 * | 4/2002 | Subbiah et al. | 709/238 |
| 6,393,484 | B1 * | 5/2002 | Massarani | 709/227 |
| 6,496,511 | B1 * | 12/2002 | Wang et al. | 370/401 |
| 6,556,562 | B1 * | 4/2003 | Bhagavath et al. | 370/352 |
| 6,556,992 | B1 * | 4/2003 | Barney et al. | 707/6 |
| 6,571,241 | B1 * | 5/2003 | Nosohara | 707/6 |
| 6,591,306 | B1 * | 7/2003 | Redlich | 709/245 |
| 6,976,053 | B1 * | 12/2005 | Tripp et al. | 709/202 |
| 2001/0056476 | A1 * | 12/2001 | Benayoun et al. | 709/218 |
| 2002/0002523 | A1 * | 1/2002 | Kossovsky | 705/36 |
| 2002/0012328 | A1 * | 1/2002 | Emanuel et al. | 370/328 |
| 2002/0024959 | A1 * | 2/2002 | Kong | 370/401 |
| 2002/0042784 | A1 * | 4/2002 | Kerven et al. | 706/12 |
| 2002/0065675 | A1 * | 5/2002 | Grainger et al. | 705/1 |
| 2002/0065676 | A1 * | 5/2002 | Grainger et al. | 705/1 |
| 2002/0072920 | A1 * | 6/2002 | Grainger | 705/1 |
| 2002/0083203 | A1 * | 6/2002 | Lim | 709/246 |
| 2002/0083207 | A1 * | 6/2002 | Andersen | 709/249 |
| 2002/0099637 | A1 * | 7/2002 | Wilkinson et al. | 106/739 |
| 2002/0116338 | A1 * | 8/2002 | Gonthier et al. | 705/52 |
| 2002/0138297 | A1 * | 9/2002 | Lee | 705/1 |
| 2002/0138635 | A1 * | 9/2002 | Redlich et al. | 709/229 |
| 2002/0141393 | A1 * | 10/2002 | Eriksson et al. | 370/352 |
| 2002/0161733 | A1 * | 10/2002 | Grainger | 706/45 |
| 2002/0176403 | A1 * | 11/2002 | Radian | 370/352 |
| 2003/0004936 | A1 * | 1/2003 | Grune et al. | 707/3 |
| 2003/0033295 | A1 * | 2/2003 | Adler et al. | 707/3 |
| 2003/0061243 | A1 * | 3/2003 | Kim et al. | 707/200 |
| 2003/0095546 | A1 * | 5/2003 | Sakano et al. | 370/352 |
| 2003/0172144 | A1 * | 9/2003 | Henry et al. | 709/223 |
| 2003/0172307 | A1 * | 9/2003 | Henry et al. | 713/201 |
| 2006/0200438 | A1 * | 9/2006 | Schloming | 707/1 |

* cited by examiner

SYSTEM AND METHOD FOR ANALYZING AND UTILIZING INTELLECTUAL PROPERTY INFORMATION

BACKGROUND OF THE INVENTION (a) Field of the Invention

The present invention relates to a system and method for analyzing and utilizing intellectual property information. More particularly, the present invention relates to a system and method for analyzing and utilizing intellectual property information that extracts intellectual property information and provides it to a research center immediately upon such information being made public. This enables easy management and analysis of intellectual property information, and makes it easy to utilize the analyzed intellectual property information.

(b) Description of the Related Art

A patent is a government-issued document that confers some special right or privilege, namely to exclude others from using, manufacturing or selling the claimed invention. These rights are given for a specified period of time. In return, the claimed invention is made public, and in so doing, the pace of development and progress in science and art is increased.

Accordingly, patents provide patentees with property rights. That is, through the protection given to patents, an inventor is given a monopoly on a claimed invention (or more precisely, the right to exclude others from the claimed invention) for a specified time period, thereby recognizing the value of an intangible asset. Hence, such intangible assets are referred to as intellectual property.

Conventional systems for managing intellectual property include filing management systems, intellectual property original document extraction systems, and patent analysis systems. Although intellectual property encompasses a wide scope of subjects, these conventional systems will be described in more detail with reference to patents, as they are the most common type of intellectual property.

(1) Filing Management Systems

Filing management systems are used in large companies and patent law firms. These systems accumulate data of dates and particulars of patent filing with respect to the sequential procedures of filing, publishing, examination, and registration.

(2) Intellectual Property Original Document Extraction Systems

These systems use programs, which have been commercialized through user interface improved systems for enabling access to original documents and easy searching, to extract patent information text files or image files in websites that offer free patent original documents such as the USPTO website.

(3) Patent Analysis Systems

Patent analysis systems extract related patents using keywords in DABS such as DIALOG, ORBIT, and QPAT in order to draft patent maps and analyze prior art, automatically perform quantitative analyses of the extracted patents, and accumulate analyzed data. Such patent analysis systems are widely used.

However, a major drawback of such systems as described above is that they are designed and programmed without any consideration to the whole processes. For example, if a patent is researched only once when patent information is necessary, the chance of a patent dispute increases because information on patents of ever-increasing development may be missed.

Further, without the thorough investigation into prior art, the possibility of making an investment in a pre-existing technology increases.

In addition, in preparing patent maps, it is difficult to obtain important information using only the analysis of quantitative data. With conventional analysis systems, particular emphasis is placed on quantitative data. Particularly with the above systems, no exchange or feedback is performed with research centers that play an important role in intellectual property such that the accumulation of precise information is not possible.

SUMMARY OF THE INVENTION

The present invention has been made in an effort to solve the above problems.

It is an object of the present invention to provide a method for analyzing and utilizing intellectual property information, in which an on-line information DB is accessed at predetermined periods using keywords such that intellectual property information is provided to a research center or interested persons, and intellectual property analysis data are accumulated.

It is another object of the present invention to provide a system for analyzing and utilizing intellectual property information.

To achieve the above object, the present invention provides a system and method for analyzing and utilizing intellectual property information. The method comprises the steps of (a) registering search strategy formulas for extracting intellectual property (IP) information; (b) accessing and searching Internet websites that provide IP information based on the registered search strategy formulas, and extracting first IP information according to the search; (c) converting the first IP information to a standard form and performing a first storage operation on the first IP information, and transmitting the converted IP information to research center PCs; (d) determining whether a request for detailed information has been made from the research center PCs, and if such a request is made, accessing the Internet websites and extracting second IP information corresponding to the first IP information; and (e) converting the second IP information to a standard form and performing a second storage operation on the converted IP information, and transmitting the converted IP information to the research center PCs.

According to a feature of the present invention, step (c) includes the steps of determining if third IP information has been received from the research center PCs, the third IP information including technical analyses and opinion contents; and performing a third storage operation on the third IP information if the third IP information has been received.

According to another feature of the present invention, step (e) includes the steps of determining if fourth IP information has been received from the research center PCs, the fourth IP information including technical analyses and opinion contents; and performing a fourth storage operation on the fourth IP information if the fourth IP information has been received.

The system for analyzing and utilizing intellectual property information comprises an intellectual property (IP) information extraction unit for extracting IP information according to operation of software from at least one on-line IP information DB found on the Internet or on a network; an IP information analyzing unit for controlling the operation of the software, receiving the extracted IP information and storing the same together with data containing predetermined opinion contents, and outputting the IP information; and an E-mail receiving/transmitting unit for transmitting the IP information received from the IP information analyzing unit to research center PCs, and receiving feedback of data containing opinion contents from the research center PCs.

According to a feature of the present invention, the IP information extraction unit comprises a front page extraction unit for requesting front pages of IP information according to a URL for accessing the on-line IP information DB, and pre-registered access information including an access period, technical classifications, and a search format, and receiving and outputting the front pages; a data converter for converting front page data and outputting the same to the IP information analyzing unit; and a specialized information extraction unit for requesting specialized IP information according to a URL for accessing the on-line IP information DB, as well as pre-registered access information including an access period, technical classifications, and a search format, and receiving and outputting the specialized IP information.

According to another feature of the present invention, the IP information analyzing unit comprises a first DB for storing patent team opinion contents of at least one of front pages or specialized pages; a second DB for storing research center opinion contents of at least one of front pages or specialized pages; a quantitative analysis unit for outputting predetermined quantitative analysis graphs; a management module for generating technical classifications and search strategy formulas for extracting IP information; and a DB management unit for receiving the front pages or specialized pages from the IP information extraction unit and storing this information in the first DB, storing the research center opinion contents received from the research center PCs in the second DB, and outputting signals for generating analysis graphs to the quantitative analysis unit.

According to yet another feature of the present invention, extraction periods of the IP information extraction unit are in real-time or programmed at predetermined intervals.

According to still yet another feature of the present invention, the IP information extraction unit stores a plurality of predetermined keywords.

According to still yet another feature of the present invention, the IP information analyzing unit separates and displays analyzed data and data that have not been analyzed.

According to still yet another feature of the present invention, the E-mail receiving/transmitting unit registers a plurality of predetermined E-mail addresses according to subject or field.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
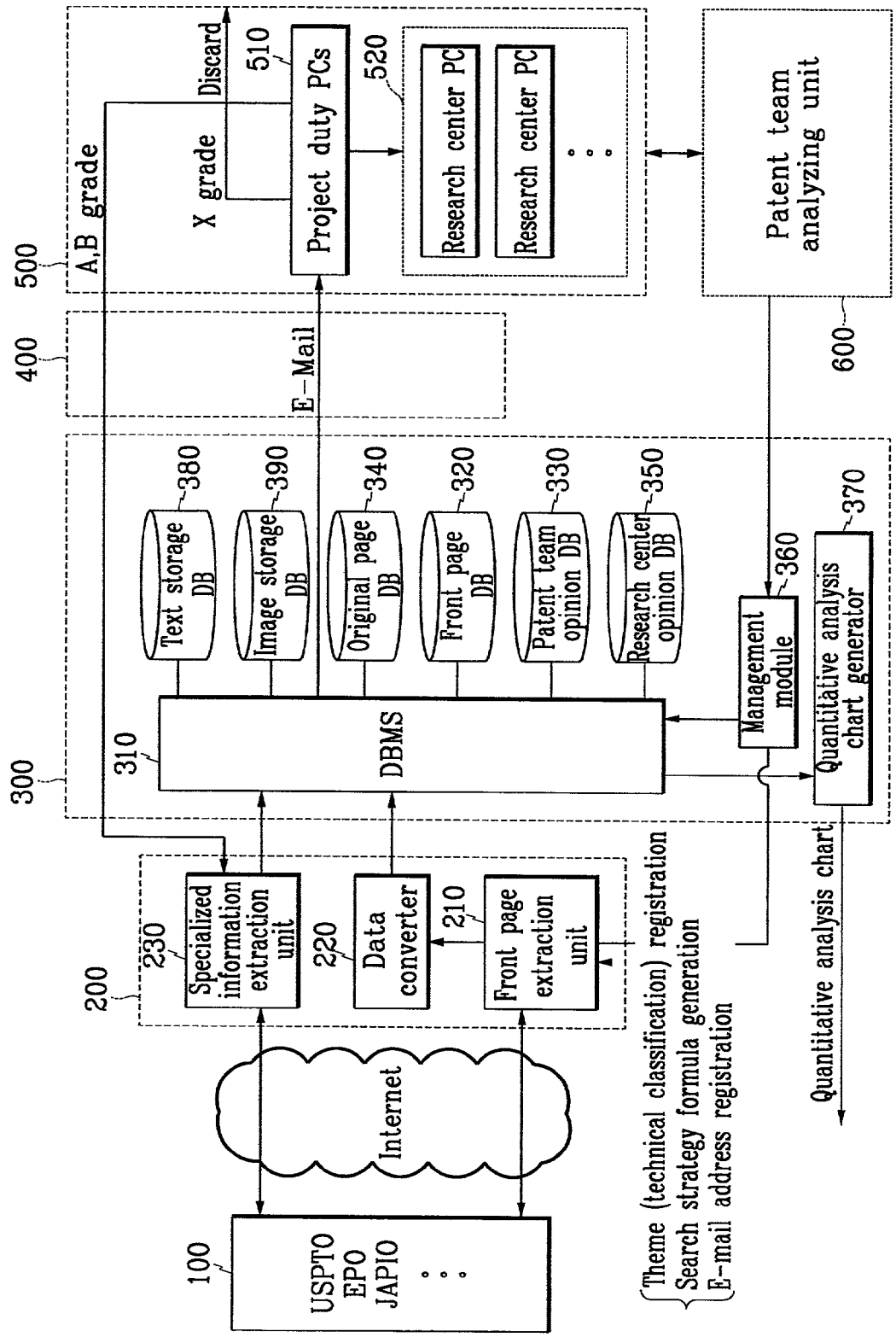
FIG. 1 is a block diagram of a system for analyzing and utilizing intellectual property information according to a preferred embodiment of the present invention.

FIG. 1 shows a block diagram of a system for analyzing and utilizing intellectual property information according to a preferred embodiment of the present invention.

As shown in FIG. 1, the system for analyzing and utilizing intellectual property (IP) information of the present invention includes on-line information databases (DABS) 100, an IP information extraction unit 200, an IP information analyzing unit 300, an E-mail receiving/transmitting unit 400, a research center analyzing unit 500, and a patent team analyzing unit 600. The on-line information DABS 100 include various IP information disseminated on the Internet and in networks, and are pre-stored material when a client accesses a DB via the Internet and requests particular information. For example, after connecting to an Internet backbone network, full texts of official patent copies can be obtained free of charge in patent search sites of patent offices of various countries and certain companies.

Most preferably, free patent information offered on websites of various countries is used (e.g., the website of the U.S. Patent and Trademark Office, www.uspto.gov). In this case, keywords matching various fields of patents (title, applicant, description, etc.) are input to find patents in the desired area. The data that is found is structured in text and/or image formats. Further, there are instances where common DABS (not websites) include detailed information (e.g., examination history) in text format. With image files, the most common are TIFF or PDF files. Since such DABS display patent documents in a format of separated pages, it is difficult to accumulate a plurality of documents. The viewers for these files utilize programs that are offered free of charge, such as ACDSEE or Acrobat Reader. Also, there are instances when patent DABS are stored in off-line CDs or on microfilm, and basic patent information utilizing these storage media can be obtained.

The IP information extraction unit 200 includes a front page extraction unit 210, a data converter 220, and a specialized information extraction unit 230. On-line IP information DABS disseminated on the Internet or in networks are accessed in real-time or during predetermined periods, and IP information is extracted according to the operation of software that is programmed to perform specific functions. The extracted IP information is then provided to the IP information analyzing unit 300.

In more detail, the front page extraction unit 210—based on registered themes (or technical classification), search strategy formulas and E-mail addresses, etc., provided from the IP information analyzing unit 300—accesses the on-line IP information DABS 100 and extracts front pages. The front page extraction unit 210 then supplies the extracted front pages to the data converter 220. The data converter 220 converts data of the front pages supplied from the front page extraction unit 210, then provides the converted data to the IP information analyzing unit 300.

The specialized information extraction unit 230 checks from the research center analyzing unit 500 whether the data is important IP information. If an image information patch is requested, the on-line information DABS 100 are accessed to patch image information with respect to corresponding IP information. The patch image information is then supplied to the IP information analyzing unit 300. Although an example was given above where the research center analyzing unit 500 requests the patch image information, this may also be performed by the patent team analyzing unit 600, which manages the IP information analyzing unit 300.

The IP information extraction unit 200 includes a function that performs automatic upgrading or automatic information updating. Accordingly, the inconvenience of inputting patent numbers or keywords when using conventional patent information search programs is avoided.

The IP information analyzing unit 300 includes a database management system (DBMS) 310, a front page DB 320, a patent team opinion DB 330, an original document page DB 340, a research center opinion DB 350, a management module 360, and a quantitative analysis chart generator 370. The IP information analyzing unit 300 controls the operation of software for extracting IP information disseminated on the Internet, receives extracted IP information and stores data containing predetermined opinion contents together with the IP information, and outputs the IP information.

In more detail, the DBMS 310 receives converted front page information from the data converter 220 of the IP information extraction unit 200 or image information from the specialized information extraction unit 230, and stores the information in the front page DB 320 and the original document page DB 340. Here, the DBMS 310 may be operated through systems such as MDB, SQL, and Oracle.

The research center opinion DB 350 stores research center opinion contents with respect to corresponding IP information received from the research center analyzing unit 500, and the patent team opinion DB 330 stores patent team opinion contents received from the patent team analyzing unit 600. The management module 360, according to control by the patent team analyzing unit 600, registers themes (or technical classifications) or generates search strategy formulas, and supplies this information together with E-mail addresses of those who desire reception of this information to the IP information extraction unit 200. The management module 360 also supplies signals for the control of data or system management, search and report management, and problem patent management. Further, the management module 360 includes a register unit (not shown) that stores keywords input by the user.

There is further included a time unit (not shown). The time unit is linked to a time checker portion of a PC or server to check a date or time and check a predetermined period. Alternatively, the time unit may check the number of times the user connects to the system of the present invention to determine an update period, or may determine whether automatic extraction of data using registered keywords has been performed at a time desired by the user.

The quantitative analysis chart generator 370 analyzes various IP information received from the DBMS 310, and outputs the information in a graph or chart format.

In the above, the front pages of patent information and specialized pages are described as being stored separately. However, in the case where the IP information extraction unit 200 includes a text extracting unit (not shown) for extracting the text of patent information and image extracting unit (not shown) for extracting images of patent information, a text storage DB 380 and an image storage DB 390 may be included in the IP information analyzing unit 300.

The E-mail receiving/transmitting unit 400 transmits IP information from the IP information analyzing unit 300 to PCs included in the research center analyzing unit 500, which is linked to IP information. The E-mail receiving/transmitting unit 400 then receives data containing opinion contents from the PCs and supplies the same to the IP information analyzing unit 300.

The research center analyzing unit 500 includes a plurality of project duty PCs 510 and a plurality of research center PCs 520. If the research center analyzing unit 500 analyzes and classifies IP information supplied from the IP information analyzing unit 300 via the E-mail receiving/transmitting unit 400 and determines that the IP information is not related to the project, the information is deleted. However, if it is determined that the information is related to the project, the research center analyzing unit 500 makes detailed information requests with respect to the corresponding information to the E-mail receiving/transmitting unit 400.

In more detail, the project duty PCs 510 receive patent front pages transmitted through the E-mail receiving/transmitting unit 400, and analyze and classify the received front pages. The patents that are not related to the project are discarded, while the patents related to the project are transmitted to the research center PCs 520. Further, the project duty PCs 510, in order to obtain more detailed information, request original document information on the corresponding patents from the IP information extraction unit 200 via the E-mail receiving/transmitting unit 400 and the IP information analyzing unit 300. The project duty PCs 510 receive the information and transmit the same to the research center PCs 520. The research center PCs 520 analyze the patent front pages and original document information received from the project duty PCs 510. The research center PCs 520 then prepare research center opinions based on the analyzed information and transmit the opinions to the project duty PCs 510.

The patent team analyzing unit 600 controls the entire flow of the IP information analyzing system of the present invention. For example, the patent team analyzing unit 600 regulates extraction periods of patent information, IP information DABS for obtaining patent information, themes (or technical classifications), E-mail address information of receiving locations, etc. to enable the management module 360 of the IP information analyzing unit 300 to obtain various types of IP information. Further, through the connection with the research center analyzing unit 500, the patent team analyzing unit 600 requests the research center analyzing unit 500 for source information, and obtains IP information based on the reply of the research center analyzing unit 500.

According to the preferred embodiment of the present invention as described above, a front page extraction unit, a data converter, and a specialized information extraction unit are included in an IP information extraction unit; and a DBMS, various DABS, a management module, and a quantitative analysis chart generator are included in an IP information analyzing unit. However, this description is provided to enable better understanding of these two elements. That is, they are not actually physically separated into such units as described. Further, the IP information extraction unit, the IP information analyzing unit, and the E-mail receiving/transmitting unit are described as separate units. However, it is also possible to provide these elements in a single unit.

Figure 2:
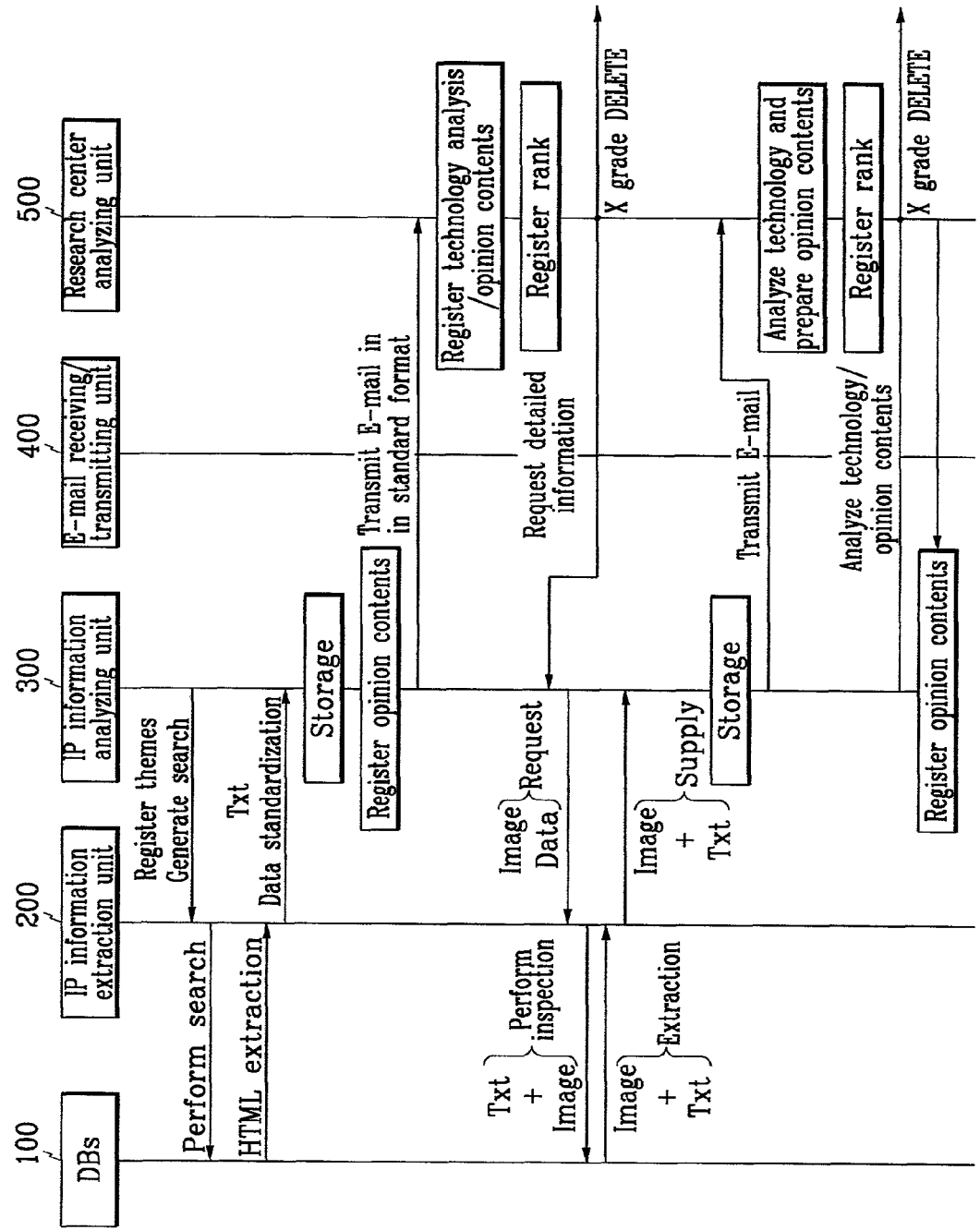
FIG. 2 is a drawing for describing a method for analyzing and utilizing intellectual property information according to a preferred embodiment of the present invention.

FIG. 2 is a drawing for describing a method for analyzing and utilizing intellectual property information according to a preferred embodiment of the present invention.

Referring to FIGS. 1 and 2, the IP information analyzing unit 300 first registers a plurality of desired themes at predetermined periods in the IP information extraction unit 200, then generates and registers a plurality of search strategy formulas for extracting IP information with respect to the registered themes. Using patents as an example, search strategy formulas that can be registered include patent publishing offices, IPCs (International Patent Classifications), patent classifications of one's own country, filing number and filing date, publication number and date, public notice number and date, priority number, inventor, applicant, abstract, title of the invention, etc.

The IP information extraction unit 200 accesses Internet sites that provide various IP information, and based on the registered search strategy formulas, extracts front pages, converts the front pages into a standard form, and provides this information to the IP information analyzing unit 300. Typically, bibliographic information, abstracts, representing agents, etc., are included on the front page of patents such that this information may be stored as a single image file, or may be divided into a field for describing the invention such that storage in text form is possible.

The IP information analyzing unit 300 receives and stores the data placed in a standard form from the IP information extraction unit 200, and performs automatic mailing to the research center analyzing unit 500. At this time, the IP information analyzing unit 300 may register opinion contents with respect to initially extracted IP information.

The research center analyzing unit 500 analyzes technology of IP information provided from the IP information analyzing unit 300, and registers opinion contents, and also registers a rank of the corresponding IP information. If it is then determined, based on the registered rank, that the information is not related to the project, the corresponding IP information is discarded. However, if it is determined that the information is related to the project, detailed information with respect to the corresponding IP information is requested from the IP information analyzing unit 300.

If a request is received for detailed information with respect to the corresponding IP information from the research center analyzing unit 500, the IP information analyzing unit 300 makes a request to the IP information extraction unit 200 for detailed information containing images and text, for example specialized data of a patent gazette. The IP information extraction unit 200, in real-time or at a time when the extraction unit is not operating, accesses DABS of suitable sites, downloads and provides the information to the IP information analyzing unit 300.

The IP information analyzing unit 300 stores the specialized data of the corresponding IP information, and automatically mails them in a standardized format to the research center analyzing unit 500. The research center analyzing unit 500 analyzes the specialized data and prepares opinion. If it is determined after registering the rank that the IP information is not related to the project, the corresponding IP information is discarded. And if it is determined that the IP information is related to the project, the prepared opinion is sent back to the IP information analyzing unit 300. At this time, the IP information analyzing unit 300 registers opinion contents based on the research center opinion supplied from the research center analyzing unit 500 or on IP information that is not related to the research center opinion contents.

In the present invention described above, related IP information can be provided to those preparing patent maps and to development research centers, and through mutual feedback processes between patent professionals and both those preparing patent maps and development research centers. As a result, the opportunity to exchange opinions on IP information is increased.

That is, published patents are downloaded periodically or in real-time such that information of new technologies related to corresponding patents is quickly provided to inventors, etc. Further, analysis contents of patent inventors with respect to basic technical classifications and important technical patents are stored such that information matching requests of research and development centers can be provided.

In addition, since it is possible, utilizing the continuously-operating system of the present invention, to automatically transmit to receivers at fixed periods using registered E-mail addresses, patent specialists may concentrate only on analyses of detailed information of patents, etc., and research centers may concentrate only on technical aspects.

Also, patent maps may be easily prepared through the accumulation of analysis data, and using various design tools, output may be performed in a variety of visual formats. Accordingly, application to patent searches of prior art or in reducing the chance of redundant filing is possible.

Finally, periodic operations may be automatically performed to improve the efficiency of an organization.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for analyzing and utilizing intellectual property (IP) information, comprising steps of:
    (a) registering search strategy formulas for extracting IP information into a IP information extraction unit;
    (b) accessing and searching Internet websites that provide IP information based on the registered search strategy formulas, and extracting first IP information according to the search;
    (c) converting the first IP information to a standard form and storing the first IP information, and transmitting the first IP information converted in the standard form to research center analyzing unit;
    (d) discarding the first IP information upon a determination by the research center analyzing unit that the first IP information is not related to at least one project accessible by the research center analyzing unit;
    (e) if the first IP information is determined to include IP information that is related to the least one project, accessing the Internet websites and extracting second IP information corresponding to the first IP information upon a request for detailed information; and
    (f) converting the second IP information to the standard form and storing and transmitting the second IP information converted in the standard form to the research center analyzing unit,
    wherein the step (c) includes steps of:
    determining if third IP information has been received from the research center analyzing unit, the third IP information including technical analyses and opinion contents; and
    storing the third IP information upon receiving third IP information, and
    wherein the IP information extraction unit stores a plurality of predetermined keywords.

2. The method of claim 1, wherein step (e) includes steps of:
    determining if fourth IP information has been received from the research center analyzing unit, the fourth IP information including technical analyses and opinion contents; and
    storing the fourth IP information upon receiving the fourth IP information.

3. A computer-based system for analyzing and utilizing intellectual property (IP) information, comprising:
    an IP information extraction computer unit, which is coupled to an IP information analyzing computer unit, for extracting IP information according to operation of software from at least one on-line IP information database (DB) found on the Internet or on a network and providing the extracted IP information to the IP information analyzing computer unit, wherein the IP information analyzing computer unit controls the operation of the software, receives the extracted IP information and stores the same together with data containing opinion contents of the extracted IP information from a research center analyzing computer unit, and outputs the extracted IP information;

an E-mail receiving/transmitting computer unit for transmitting the extracted IP information outputted from the IP information analyzing computer unit to the research center analyzing computer unit, and receiving feedback of the data containing the opinion contents from the research center analyzing computer unit, wherein the research center analyzing computer unit is coupled to the IP information extraction computer unit and wherein the research center analyzing computer unit determines whether the extracted IP information includes IP information that is related to at least one project accessible by the research center analyzing computer unit, and discarding the IP information upon a determination that the IP information is not related to the at least one project accessible by the research center analyzing computer unit, and if the extracted IP information is determined to include IP information that is related to the at least one project, requesting detailed information corresponding to the IP information that is related to the at least one project from the IP information extraction computer unit, wherein the IP information extraction computer unit comprises:

a front page extraction computer unit for requesting front pages of IP information according to a universal resource locator (URL) for accessing the on-line IP information DB, and pre-registered access information including an access period, technical classifications, and a search format, and receiving and outputting the front pages, and wherein the IP information extraction computer unit stores a plurality of predetermined keywords.

4. The computer-based system of claim 3, wherein the IP information extraction computer unit further comprises:

a data converter for converting front page data and outputting the same to the IP information analyzing computer unit; and a specialized information extraction computer unit for requesting specialized IP information according to a URL for accessing the on-line IP information DB, and pre-registered access information including an access period, technical classifications, and a search format, and receiving and outputting the specialized IP information.

5. The computer-based system of claim 3, wherein the IP information analyzing computer unit comprises:

a first DB for storing patent team opinion contents of at least one of front pages or specialized pages;

a second DB for storing research center opinion contents of at least one of front pages or specialized pages;

a quantitative analysis computer unit for outputting predetermined quantitative analysis graphs;

a management module for generating technical classifications and search strategy formulas for extracting IP information; and a DB management computer unit for receiving the front pages or specialized pages from the IP information extraction computer unit and storing this information in the first DB, storing the research center opinion contents received from the research center analyzing computer unit in the second DB, and outputting signals for generating analysis graphs to the quantitative analysis computer unit.

6. The computer-based system of claim 3, wherein extraction periods of the IP information extraction computer unit are in real-time or programmed at predetermined intervals.

7. The computer-based system of claim 3, wherein the IP information analyzing computer unit separates and displays analyzed data and data that have not been analyzed.

8. The computer-based system of claim 3, wherein the E-mail receiving/transmitting computer unit registers a plurality of predetermined E-mail addresses according to subject or field.

9. A computer-based system for analyzing and utilizing intellectual property (IP) information, comprising:

an IP information extraction computer unit, which is coupled to an IP information analyzing computer unit, for extracting IP information according to operation of software from at least one on-line IP information database (DB) found on the Internet or on a network and providing the extracted IP information to the IP information analyzing computer unit, wherein the IP information analyzing computer unit controls the operation of the software, provides technical classifications and search strategy formulas to the IP information extraction computer unit, receives the extracted IP information and stores the same together with data containing opinion contents of the extracted IP information from a research center analyzing computer unit, and outputs the extracted IP information; and an E-mail receiving/transmitting computer unit for transmitting the extracted IP information outputted from the IP information analyzing computer unit to the research center analyzing computer unit, and receiving feedback of the data containing the opinion contents from the research center analyzing computer unit, wherein the research center analyzing computer unit is coupled to the IP information extraction computer unit and wherein the research center analyzing computer unit determines whether the extracted IP information includes IP information that is related to at least one project accessible by the research center analyzing computer unit, and if the extracted IP information is determined to include IP information that is related to the at least one project, requesting detailed information corresponding to the IP information that is related to the at least one project from the IP information extraction computer unit, and discarding the IP information upon a determination that the IP information is not related to the at least one project accessible by the research center analyzing computer unit, and wherein the IP information extraction computer unit stores a plurality of predetermined keywords.

10. The computer-based system of claim 9, wherein the IP information extraction computer unit comprises:

a front page extraction computer unit for requesting front pages of IP information according to a universal resource locator (URL) for accessing the on-line IP information DB, and pre-registered access information including an access period, technical classifications, and a search format, and receiving and outputting the front pages;

a data converter for converting front page data and outputting the same to the IP information analyzing computer unit; and a specialized information extraction computer unit for requesting specialized IP information according to a URL for accessing the on-line IP information DB, and pre-registered access information including an access period, technical classifications, and a search format, and receiving and outputting the specialized IP information.

11. The computer-based system of claim 9, wherein the IP information analyzing computer unit further comprises:
- a first DB for storing patent team opinion contents of at least one of front pages or specialized pages;
- a second DB for storing research center opinion contents of at least one of front pages or specialized pages;
- a quantitative analysis computer unit for outputting predetermined quantitative analysis graphs; and
- a DB management computer unit for receiving the front pages or specialized pages from the IP information extraction computer unit and storing this information in the first DB, storing the research center opinion contents received from the research center analyzing computer unit in the second DB, and outputting signals for generating analysis graphs to the quantitative analysis computer unit.

12. The computer-based system of claim 9, wherein extraction periods of the IP information extraction computer unit are in real-time or programmed at predetermined intervals.

13. The computer-based system of claim 12, wherein the predetermined intervals are determined based on the number of times a user connects to the computer-based system for analyzing and utilizing IP information.

14. The computer-based system of claim 9, wherein the IP information analyzing computer unit separates and displays analyzed data and data that have not been analyzed.

15. The computer-based system of claim 9, wherein the E-mail receiving/transmitting computer unit registers a plurality of predetermined E-mail addresses according to subject or field.

* * * * *